United States Patent [19]
Minks

[11] Patent Number: 5,459,357
[45] Date of Patent: Oct. 17, 1995

[54] ENGINE OPERATED SWITCH FOR CONTROLLING OPERATION OF ELECTRICAL LOAD RESPONSIVE TO ALTERNATOR VOLTAGE AND/OR BATTERY VOLTAGE

[76] Inventor: Floyd M. Minks, 2700 Partin Settlement Rd., Kissimmee, Fla. 32741

[21] Appl. No.: 743,163

[22] Filed: Aug. 8, 1991

[51] Int. Cl.⁶ ............................... B60L 11/12; H02P 9/04
[52] U.S. Cl. .............................. 307/10.7; 290/50; 307/47; 307/48; 322/8
[58] Field of Search ................. 322/7, 8, 29, 28, 322/99; 307/10.7, 10.1, 9.1, 17, 47, 68, 76, 48, 66; 290/50, 36 R, 46; 340/455; 123/630

[56] References Cited

U.S. PATENT DOCUMENTS

| | | |
|---|---|---|
| 3,623,464 | 11/1971 | Patis ........................................ 123/630 |
| 3,868,559 | 2/1975 | Hill et al. ................................... 322/8 |
| 4,137,557 | 1/1979 | Cairniello et al. ...................... 307/10.7 |
| 4,323,837 | 4/1982 | Nakamura et al. ......................... 322/7 |
| 4,791,349 | 12/1988 | Minks ...................................... 323/273 |
| 4,815,052 | 3/1989 | Walker ...................................... 363/87 |
| 5,136,232 | 8/1992 | Meidan ....................................... 322/8 |

Primary Examiner—A. D. Pellinen
Assistant Examiner—Richard Elms
Attorney, Agent, or Firm—Allen, Dyer, Doppelt, Franjola & Milbrath

[57] ABSTRACT

An apparatus for switching on and off vehicular electrical loads. The switching of these loads is controlled automatically by sensing alternator output voltage either alone or in combination with alternator frequency and or vehicle battery voltage.

4 Claims, 2 Drawing Sheets

5,459,357

ENGINE OPERATED SWITCH FOR CONTROLLING OPERATION OF ELECTRICAL LOAD RESPONSIVE TO ALTERNATOR VOLTAGE AND/OR BATTERY VOLTAGE

This invention relates to an electronic switching system for electrical loads associated with small engine-driven vehicles.

BACKGROUND OF THE INVENTION

The electrical systems commonly used on recreational vehicles, such as snowmobiles, all-terrain vehicles or small personal watercraft, typically contains an engine-driven alternator usually of a permanent magnet type. This alternator supplies power to the vehicle's electrical system which may consist of a battery, used for starting or other loads, and a lighting system. The lighting system may be run either directly from the alternating current output of the alternator or from the battery. In watercrafts, fuel pumps and bilge pumps are commonly part of the electrical load. A manual switch is sometimes used to turn off and on lights partially when the lights are run from the battery. Safety considerations, and in some cases government regulations, may prescribe that lights on recreational vehicles be on all the time that the engine is operating. The batteries on these vehicles are relatively small and the alternator outputs are frequently insufficient to supply the full brilliance of the lights at engine idle. Therefore, batteries are frequently run down either by operation with extended periods at idle or by the light not being turned off promptly when the engine is stopped. It is the purpose of this invention to supply an automated system for controlling lights or other loads. This system is responsive to the operation of the engine to turn on the load whenever the engine is operating, or only above a selected engine speed. One version of this invention is also responsive to the state of charge of the vehicle battery, automatically reducing the power to the lights to the power available from the alternator when the battery is below a given voltage. It is an object of this invention to utilize the alternator power to operate loads as required without manual load switching by the vehicle operator.

DESCRIPTION OF THE DRAWINGS

The above and other objects, and features of the invention will become apparent from the following detailed description taken in conjunction with the accompanying drawings which show a portion of the vehicle electrical system and the components specific to this invention connected therein. A portion of the circuit in FIGS. 2 and 3 are similar to the circuits in applicant's Pat. Nos. 4,791,349 and 4,774,924, respectively. Knowledge of these circuits is assumed. Therefore, a complete description of these portions will not be repeated in this application.

DETAILED DESCRIPTION OF PREFERRED EMBODIMENT

The invention will now be described in detail with reference to the figures.

Figure 1:
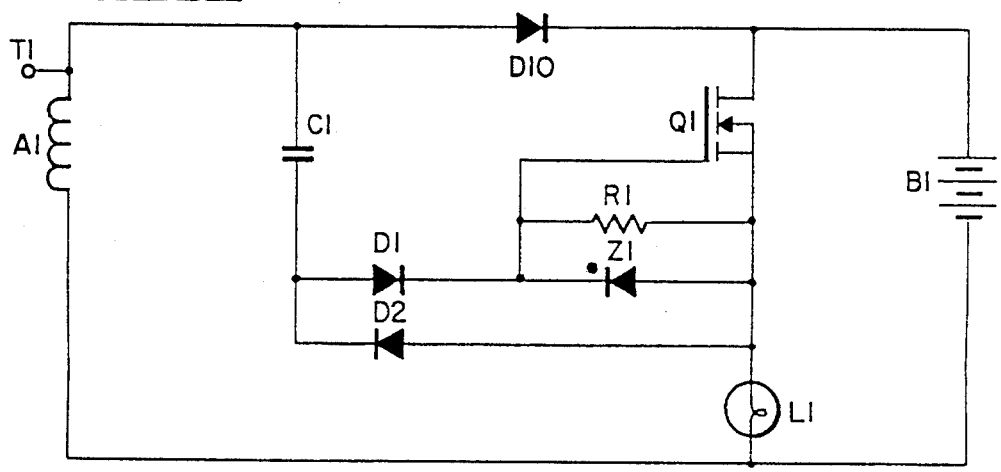
FIG. 1 shows a basic version of the invention such as would be used to turn on a load whenever the engine is running.

In FIG. 1 the existing electrical system is represented by an alternator winding A1 connected through a diode D10 to charge a battery B1. An electrical load, shown as L1, is also part of the existing electrical system and would normally be connected to the battery through a switch manually controlled by the operator. The alternator would typically be of the permanent magnet type.

L1 represents a lamp or other load that is desired to be energized when the engine is running and therefore when alternator A1 is producing output voltage. The remaining components comprise the engine operated switch of this invention. Transistor Q1 is shown as an N-Channel enhancement mode field-effect transistor. This transistor is connected in series with the lamp L1 to control the flow of electrical power from the battery through the load. Thus the drain terminal of the transistor is connected to the battery positive and the source terminal is connected to the lamp with the remaining lamp terminal connected to the battery negative. The gate, or control electrode of transistor Q1, is connected through capacitor C1 and diodes D1 and D2 to the alternator. These components are connected so that the gate is at a positive potential compared to the source when the engine is operating, and therefore alternating current voltage is present at the output of A1. A significant amount of electrical capacitance is inherent between the gate and source terminals of transistor Q1. Resistor R1 is selected to have a time constant with this capacitance that is long, when compared to the period of the AC output of the alternator, but sufficiently short to insure timely turn off of the lights after the engine has stopped. Zener diode Z1 is connected from the gate to the source of transistor Q1 to limit the voltage that is supplied to the gate to levels that are safe for the type of transistor being used. This limiting is effective whether these voltages are from normal operation of the alternator or from any static electricity discharge which may occur in handling the assembly. During the portion of the alternator cycle when alternator terminal T1 is negative, current will flow through diode D2 thus charging the lower terminal of capacitor C1 positive with respect to the upper terminal. During the portion of the cycle when terminal T1 next becomes positive, the current will flow from the previously positive charged lower terminal of C1 through diode D1 to the gate of Q1. If, as previously described, the time constant of resistor R1 and the input capacitance of Q1 is long compared to the alternator period, transistor Q1 will remain on during the entire cycle of the alternator thus effectively applying battery voltage, through the low on resistance of Q1, to the load L1. The current available from the combination of C1, D1 and D2 to the gate terminal of Q1 and associated components is proportional to both the voltage of the alternator and the frequency of the alternator. If the alternator is a permanent magnet type directly driven from the engine and of the size typical of many of the vehicles that this system would be applied to, both the voltage and frequency are proportional to engine speed at the low speed or idle speed of the engine. Thus one skilled in the art, and knowing the gate voltage to turn on Q1, could select appropriate values for C1 and R1 to turn on load L1 only at or above a desired engine speed. The desired engine speed might, under some conditions, be selected above idle to prevent the discharge of battery B1 at idle. The circuit of FIG. 1 is particularly useful where the load L1 is an electric fuel pump used to supply fuel to the engine driving alternator A1. If the fuel pump is allowed to run when the engine is stopped a severe fire hazard exists if the carburetor needle and seat do not seal perfectly. The use of this invention eliminates this hazard. If the alternator A1 does not supply sufficient output at cranking speed to turn on Q1, a diode, not shown, may be connected with its anode to the starter and its cathode connected to the ungrounded terminal of the load L1. Thus Q1 will be bypassed whenever the starter is operating.

Figure 2:
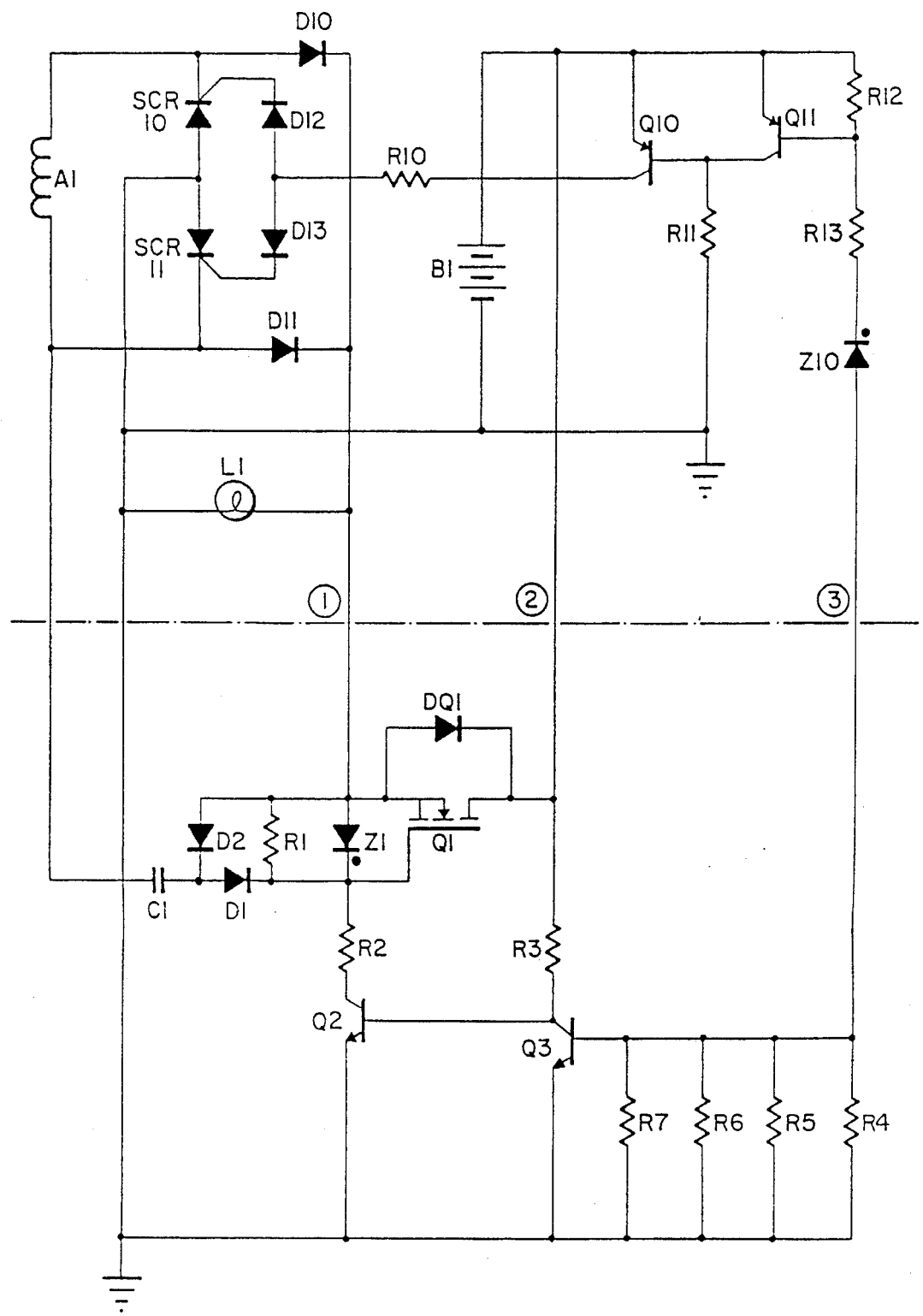
FIG. 2 shows a version of the invention sensitive to both engine operation and battery voltage.

It should also be realized that diode D10 could be replaced, by one knowledgeable of the art, with other rectification means which could be multiple diodes for full wave rectification, or solid state switching devices, such as transistors or silicon control rectifiers made responsive typically to battery voltage. FIG. 2 shows one such system.

In the embodiment of this invention shown in FIG. 2, transistor Q1, and thus the load shown as L1, is made responsive not only to the alternator output as previously described but also to the condition of battery B1 as will now be described. The components in FIG. 2 that correspond to the function already described for components in FIG. 1 are similarly numbered. Diode DQ1 is shown connected from the source to the drain of transistor Q1. In the commercial fabrication of these transistors, this diode is inherent in the construction of the transistor even though it is usually not shown in the symbol thereof. The components in FIG. 2 with numbers 10 and higher, represent the components of a battery charging regulator of a type that is known. The functioning of these regulator components will be described only briefly herein. In the normal use of regulators of this type, the terminals numbered 1 and 2 would be connected together within the regulator and terminal 3 would be connected to ground or common within the regulator. Diodes D10 and D11 in combination with SCR10 and SCR11 comprise a full wave bridge allowing flow of power from alternator A1 to battery B1 upon the application of a gate signal to the gates of SCR10 and SCR11. This gate signal is supplied through diodes D12 and D13 and controlled by transistor Q10. The maximum gate current is controlled to levels that will protect Q10 by resistor R10. Transistor Q10 is normally biased on by resistor R11. Transistor Q11 when turned on, is connected to remove this bias from the input of transistor Q10 thus removing the gate drive from SCR10 and SCR11 and turning off the output of the regulator. The base, or input terminal, of transistor Q11 is made responsive to the state of charge of the battery, or battery voltage, by zener diode Z10 and a resistive divider consisting of resistors R12 and R13. Therefore, when the battery voltage rises to a selected level, transistor Q11 is turned on, thus turning off transistor Q10 and SCR10 and SCR11. This prevents charging of the battery above the desired voltage. The components associated primarily with this known regulator are shown above the dashed line in FIG. 2. Transistor Q1 is connected between terminals 1 and 2. The output of the previously described bridge rectification circuit can pass through diode DQ1 to charge the battery B1. When the gate of Q1 is positive with respect to the source, the voltage drop for current flowing in the direction possible through DQ1 may be lower than the voltage drop that would be expected in a silicon diode. Thus transistor Q1 has negligible effect on the normal charging of the battery B1 from the alternator A1. The requirements for biasing Q1 on and the functions of components C1, D1, D2, R1 and Z1 are as previously described referring to FIG. 1, unless Q2 is on as will be described hereafter. When transistor Q1 is biased on, the power required by the load L1 can flow either from the battery through Q1 or from the alternator through the bridge components D10, D11, SCR10 and SCR11 if they are on and the instantaneous alternator voltage is higher than the battery voltage. Note that the voltage between the source and drain terminals of Q1 will be very small. Gate voltage can be selectively removed from Q1 in FIG. 2 by control of transistor Q2 in series with current limiting resistor R2. Resistor R2 would be a low enough value to remove drive from transistor Q1 even in the presence of the maximum current available through the combination of C1, D1 and D2. Thus Q1 may be turned off by turning on Q2. Resistor R3 is selected to supply sufficient drive to turn Q2 on at the previously described required maximum current level. Q2 can be turned off by removing its base drive. This is accomplished by turning on transistor Q3. Transistor Q3 is turned off or on by varying the voltage between its base and emitter terminals. This voltage is controlled by the voltage of the battery B1, and the components Z10, R12, R13, and R4 in series. Resistor R4 is connected in parallel with resistors R5, R6, and R7 which would normally be much higher resistance than R4. Thus the battery voltage above which Q3 is turned on can be accurately adjusted by removing R5, R6 or R7, or a combination thereof, as required. Thus a battery voltage is established below which no further discharge of the battery by supplying power to L1 is allowed.

For example:
1) A typical value, with commercial components, might be 14.4 volts plus or minus 0.2 volts for the battery charging limit as controlled primarily by the components above the dashed line in FIG. 2.
2) Resistors R4, R5, R6, and R7 and the other voltage controlling components might be chosen to give 13.0 plus or minus 0.2 battery volts for the switching point of Q1 with normal commercial tolerance of components.
3) Resistors R5, R6, and R7 might be specified to change the switching point of Q1 in reference to battery voltage, by 0.06, 0.12, and 0.24 volts respectively upon removal.
4) Then by removing the appropriate combination of R5, R6, and R7, an operating point of 12.8 plus or minus 0.03 volts could be established for Q1. Thus the minimum level of discharge voltage of the battery by load L1 can be very accurately established. Known limits of component stability and temperature coefficients would also apply. Thus transistor Q1 would be on only if both of the following two conditions exist:
   1. The alternator A1 is producing an output voltage of above a selected level.
   2. The direct current voltage of battery B1 is above a selected level.

This selected level of the DC voltage of battery B1 can be chosen to allow a portion of the energy stored in battery B1 to be used to keep the load shown as light L1 on but to prevent that load from completely discharging the battery during periods of extended engine idling. If the voltage of battery B1 drops to the selected level transistor Q3 turns off, therefore turning on transistor Q2 and thus turning off transistor Q1. Note that the load or lamp L1 is not turned completely off under these conditions. Since the battery is also below the voltage required to turn on Q11, gate drive is present to SCR10 and SCR11. Thus power from the alternator can flow through the bridge consisting of diodes D10, D11, SCR10 and SCR11 directly to the load L1. Thus rectified alternating current is applied from the alternator A1 to the load L1 under engine operating conditions when the battery's state of charge, represented by its terminal voltage, is below the level selected. This prevents further battery discharge by disconnecting the load from the battery and effectively connects the load to the alternator output.

Figure 3:
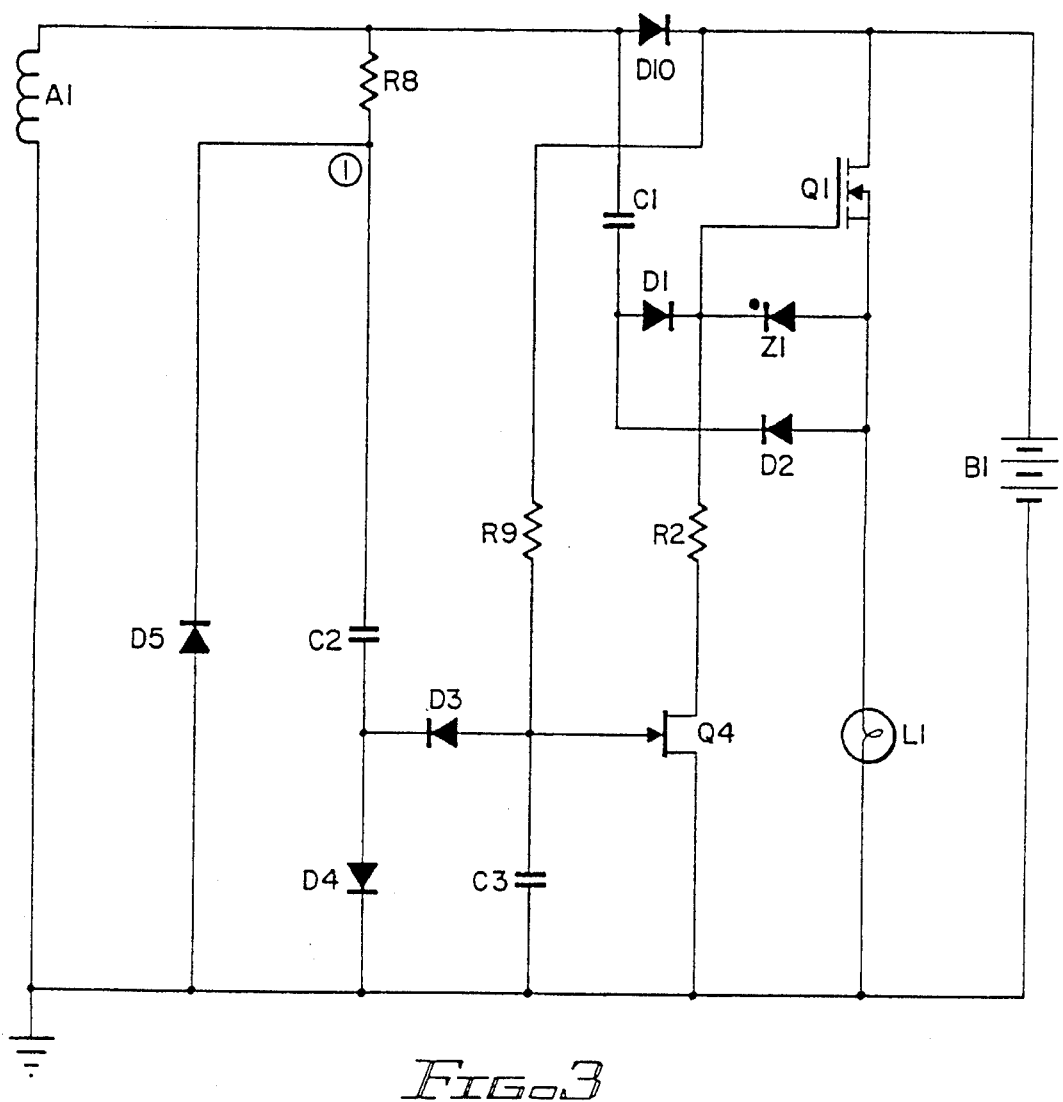
FIG. 3 shows a version of the invention such as would be used to turn on a load over only a portion of the engine speed range. This portion could be controlled with greater accuracy than with the version of FIG. 1.

FIG. 3 shows a version of this invention with additional components so that the alternator frequency, and therefore the engine speed, above which the load is energized may be more accurately established. Transistor Q4 is shown as a N-Channel junction field-effect transistor. This type of transistor is normally on, being turned off by a negative gate voltage. Thus the load L1 will be on only if the alternator is supplying power through C1 to the gate of Q1 and also a negative voltage large enough to turn off Q4 is applied to the gate of Q4. Two opposing signals are applied by the circuit to the gate of Q4. One is a positive current from the battery through resistor R9. The value of this current is approximately proportional to battery voltage. The second current is negative and is proportional to alternator frequency multiplied by the voltage change across capacitor C2 during each alternator cycle. The voltage at point 1 is limited during the positive half of the alternator cycle by current through D10 to the battery. The resulting voltage equals the battery voltage plus the diode forward drop of D10. During the negative half cycle the voltage is limited by the forward drop of D5. The total peak to peak voltage change during each cycle at point 4 is thus equal to the battery voltage plus the forward drop of two diodes. This peak to peak voltage produces a charging and discharging of C2 which is rectified by diodes D3 and D4 to produce an average negative current at the gate of Q4. This average current is proportional to the voltage change at point 1 minus the forward drop of two diodes. Thus the forward drop in diodes D5 and D10 is approximately cancelled by that in D3 and D4 giving an average negative current component proportional to battery voltage multiplied by alternator frequency. The time constant of R8 and C2 would normally be short compared to the alternator period, but long enough to filter out high frequency noise that may be present. Capacitor C3 is large enough to effectively leave only DC voltage at the gate of Q4. Thus if the gate voltage to turn off Q4 is small compared to the battery voltage (which would be normal with common components), the turn off point for Q4 is a function of alternator frequency only. The effects of diode drops including temperature coefficients largely cancel, and the effect of battery voltage also cancels as it equally effects opposing currents as previously described. It should be realized that one skilled in the state of the art might substitute other devices for those described and shown in the figures. For example Q1 might be replaced by many types amplifying or switching devices. These devices would in general have an input terminal, an output terminal, and a common input output terminal so that a low level of power connected to the input would control a high level of power connected to the output. This would be within the scope of this teaching, and that while the invention has been described in what is presently considered to be a preferred embodiment, many modifications will become apparent to those skilled in the art. It is intended therefore, by the appended claims to cover all such modifications as far within the true spirit and scope of the invention.

What is claimed is:

1. A system for controlling the operation of an electrical load in a vehicle, said vehicle being driven by an engine, said engine also driving an alternator having an alternating current output, said output being rectified to charge a battery which is part of the electrical system of said vehicle, an amplifying device connected to control the flow of power from said battery to said electrical load and having an input terminal, a control network, said input terminal connected through the control network to receive power from said alternating current output when said engine is operating, and wherein said control network is also responsive to the voltage of said battery so that said load is allowed to receive power from said battery only whenever said engine is operating and said battery is above a selected voltage.

2. A system for controlling the operation of an electrical load in a vehicle, said vehicle being driven by an engine, said engine also driving an alternator having an alternating current output, said output being rectified to charge a battery which is part of the electrical system of said vehicle, an amplifying device connected to control the flow of power from said battery to said electrical load and having an input terminal, a control network, said input terminal connected through the control network to receive power from said alternating current output when said engine is operating, and wherein the input to said amplifying device is removed whenever the voltage of said battery is below a selected level.

3. A vehicular electrical system containing an alternator connected through a rectifying means to charge a battery, an electrical load, and switch amplifying means to automatically connect said load to said battery when said battery is above a selected voltage and said alternator is operating, said amplifying means effectively connecting said load to said alternator when said battery is below said selected voltage.

4. The system recited in claim 3 wherein said alternator is of the permanent magnet-type.

* * * * *